Dec. 22, 1925.

G. E. PRUITT 1,566,969

ENGINE SHAFT THRUST BEARING

Filed Dec. 22, 1923

Gene E. Pruitt
INVENTOR

BY Victor J. Evans
ATTORNEY

WITNESS: R. E. Wise.

Patented Dec. 22, 1925.

1,566,969

UNITED STATES PATENT OFFICE.

GENE E. PRUITT, OF FREDERICK, OKLAHOMA.

ENGINE-SHAFT THRUST BEARING.

Application filed December 22, 1923. Serial No. 682,311.

*To all whom it may concern:*

Be it known that I, GENE E. PRUITT, a citizen of the United States, residing at Frederick, in the county of Tillman and State of Oklahoma, have invented new and useful Improvements in Engine-Shaft Thrust Bearings, of which the following is a specification.

This invention relates to accessories for automobile engines, particularly to thrust bearing devices, and has for its object the provision of a novel thrust bearing designed for use in connection with a Ford automobile engine for the purpose of taking up the thrust of the clutch spring upon the rear main bearing, the device thus operating to prevent wear of the bearing and consequent movement of the fly wheel and magnets away from the field coils of the magneto.

An important object is the provision of a device of this character designed for interposition between the transmission clutch spring support and the universal ball cap, the device being held in position without any necessity whatever for the employment of securing devices, the engagement of the engine parts with the device effecting all necessary holding action.

An additional object is the provision of a device of this character which will be simple and inexpensive in manufacture, easy to install, positive in action, efficient and durable in service and a general improvement in the art.

Figure 1:
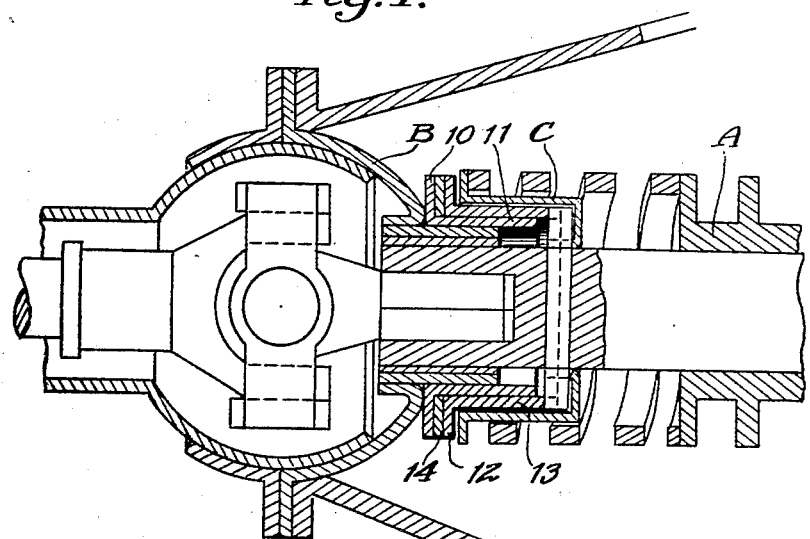
Figure 2:
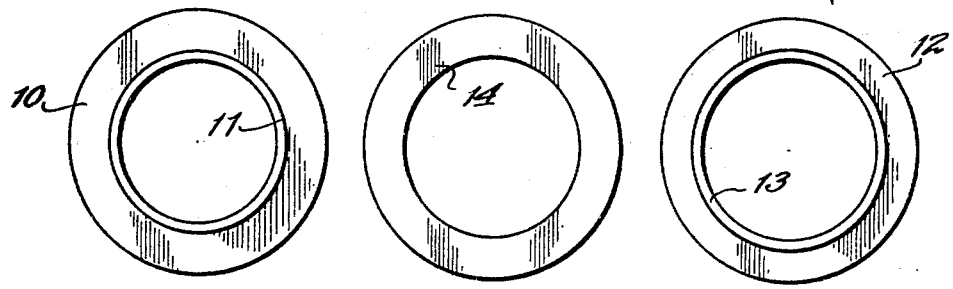
Figure 3:
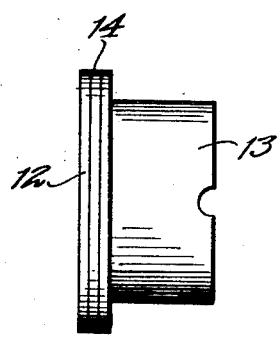

With the above and other objects and advantages in view the invention consists in the details of construction to be hereinafter more fully described and claimed and illustrated in the accompanying drawings, in which:

Figure 1 is a longitudinal section through a portion of the transmission of a Ford automobile showing my device in applied position, Figure 2 is a side elevation of the parts of the device disconnected and Figure 3 is a face view thereof assembled.

Referring more particularly to the drawings the letter A designates a portion of the transmission of a Ford automobile, B represents the universal ball cap, and C the transmission clutch spring support.

In carrying out my invention I provide a thrust bearing structure which comprises a disk 10 of suitable metal formed with a sleeve 11 adapted to fit snugly on a bearing sleeve D at the forward end of the universal ball cap B. In conjunction with this element, I provide a disk 12 carrying a sleeve 13 which fits within the transmission clutch spring support C and which telescopically receives the sleeve 11. Disposed between these two elements is a washer 14 of babbitt or other soft metal, which washer takes up the wear and the thrust so that no longitudinal strain will come upon the rear main bearing of the engine, the device consequently operating to prevent eventual rearward movement of the crank shaft and movement of the fly wheel and magnets away from the stationary coils of the magneto structure.

From the foregoing description and a study of the drawings it will be apparent that I have thus provided a simply constructed, inexpensive and easily installed thrust bearing device which will efficiently perform the function for which it is intended, and which will operate to insure a longer life of the engine bearings and other parts of the mechanism.

While I have shown and described the preferred embodiment of my invention it is of course to be understood that I reserve the right to make such changes in the form, construction and arrangement of parts as will not depart from the spirit of the invention or the scope of the subjoined claim.

I claim:

In combination with the universal ball cap and clutch spring support of an automobile transmission, and with a bearing sleeve at the forward end of the ball cap, a thrust bearing structure interposed between said elements, and comprising a disk having a sleeve surrounding the bearing sleeve, a second disk having a sleeve telescoping the firstnamed sleeve and fitting within the transmission clutch spring support, and a renewable washer fitting between said disks.

In testimony whereof I affix my signature.

GENE E. PRUITT.